United States Patent [19]

Rasmussen et al.

[11] Patent Number: 5,168,872
[45] Date of Patent: Dec. 8, 1992

[54] BOOM, PARTICULARLY A SPREADING BOOM FOR SUSPENSION ON AN OUTER FRAME OF AN AGRICULTURAL TOOL, SUCH AS AN AGRICULTURAL VEHICLE

[75] Inventors: Knud Rasmussen; Steen Tolboll, both of Taastrup, Denmark

[73] Assignee: Hardi International A/S, Denmark

[21] Appl. No.: 636,428

[22] Filed: Dec. 31, 1990

[30] Foreign Application Priority Data

Jan. 12, 1990 [DK] Denmark ............................ 105/90

[51] Int. Cl.⁵ ............................................. B60D 1/00
[52] U.S. Cl. .................................... 248/560; 172/449
[58] Field of Search ............... 248/560, 564, 584, 591, 248/593, 595, 610, 611, 613, 589, 585, 624, 638; 56/15.8, 15.7, 15.9; 239/163, 172; 280/483, 413; 172/449, 450, 451

[56] References Cited

U.S. PATENT DOCUMENTS

| | | | |
|---|---|---|---|
| 2,036,993 | 4/1936 | Allen | 280/483 X |
| 2,379,225 | 6/1945 | Fraga | 172/451 |
| 2,620,855 | 12/1952 | Stone | 248/595 |
| 2,888,997 | 6/1959 | Fraga | 172/449 X |
| 3,720,392 | 3/1973 | Kulander | 248/593 |
| 3,921,951 | 11/1975 | Blok | 248/591 |
| 4,031,965 | 6/1977 | Blair | 56/15.8 X |
| 4,113,273 | 9/1978 | Gates | 280/413 |

FOREIGN PATENT DOCUMENTS

| | | |
|---|---|---|
| 2671/85 | 6/1985 | Denmark . |
| 2025183 | 1/1972 | Fed. Rep. of Germany . |
| 1901732 | 4/1973 | Fed. Rep. of Germany . |
| 2160227 | 6/1973 | Fed. Rep. of Germany . |
| 1564543 | 4/1969 | France . |
| 2423127 | 12/1979 | France ............................ 239/163 |

Primary Examiner—Karen J. Chotkowski
Attorney, Agent, or Firm—Hill, Van Santen, Steadman & Simpson

[57] ABSTRACT

A boom, particularly a spreading boom for suspension on an outer frame (1) of an agricultural tool and of the type in which the suspension device comprises spring suspension and shock absorbing devices in the form of a trapezoidal suspension with two substantially parallel beams of which one is connected to the outer frame (1). According to the invention the upper beam of the trapezoidal suspension is linked, each of the links (6, 7) being pivotally connected to the outer frame (1) and springs (12) being arranged on both sides of the linkage (20, 21), but on the other side of the center of suspension (8, 9). The individual spring (12) is arranged between one of said links (6, 7) and a separate beam fastened to the outer frame (1).

3 Claims, 4 Drawing Sheets

BOOM, PARTICULARLY A SPREADING BOOM FOR SUSPENSION ON AN OUTER FRAME OF AN AGRICULTURAL TOOL, SUCH AS AN AGRICULTURAL VEHICLE

FIELD OF THE INVENTION

The invention relates to a boom, particularly a spreading boom for suspension on a suspension boom of an agricultural tool, such as an agricultural vehicle, and of the type in which the suspension device comprises spring suspension and shock absorbing devices, such as a trapezoidal suspension with two substantially parallel beams, the upper beam being connected to the suspension boom.

BACKGROUND ART

A trapezoidal suspension of this type is known from for instance a French patent in the name of Evrard and from Danish patent application No. 2671/85. The trapezoidal suspension disclosed therein is encumbered with the drawback that booms connected thereto, especially very long booms, oscillate in relation to the horizontal plane, if for instance one of the wheels of the agricultural vehicle encounters irregularities of the ground.

SUMMARY OF INVENTION

The object of the present invention is therefore to provide a trapezoidal suspension which does not oscillate in relation to the horizontal plane. According to the invention the aforementioned object is achieved by the upper beam of the trapezoidal suspension being linked, each of the links being pivotally connected to the suspension boom, and springs being adapted on both sides of the linkage, but on the other side of the center of suspension. As a result, the boom is subjected to a more symmetrical load in such a manner that it does not oscillate significantly in relation to the horizontal plane, the load subjected to one side being transferred to the other side by means of the linked upper beam whereby the load is almost symmetrical.

The individual spring is preferably mounted between one of said links and the boom suspension beam per se.

A shock absorbing device is mounted between one of the diagonal bars of the trapezoidal suspension and the lower horizontal beam to attenutate possible oscillations.

BRIEF DESCRIPTION OF THE DRAWINGS

The invention is described in greater details below with reference to the drawings in which.

DESCRIPTION OF THE PREFERRED EMBODIMENTS

Figure 1:
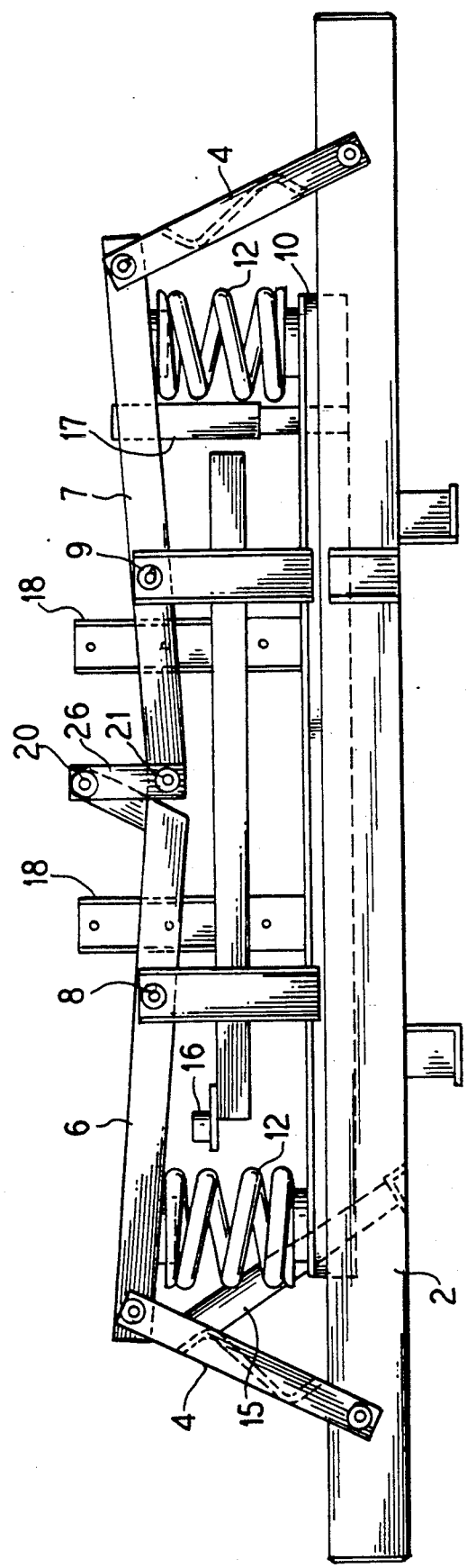
FIG. 1 shows the middle portion of a spreading boom according to the invention with associated suspension frame.
Figure 2:
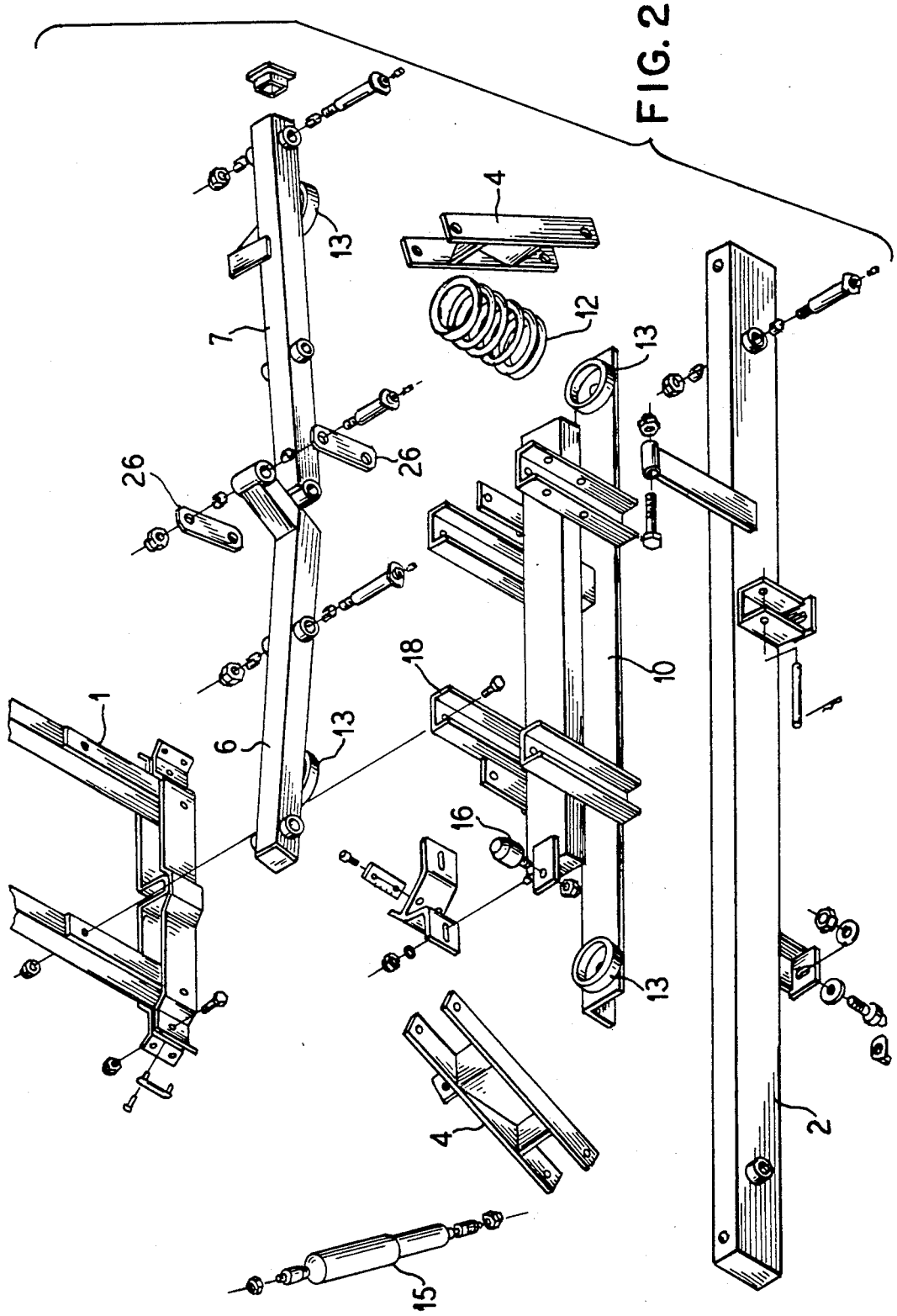
FIG. 2 is an exploded view of the spreading boom.

The spreading boom shown in FIGS. 1 and 2 is adapted to be mounted on an agricultural tool, optionally in connection with an agricultural vehicle such as a tractor. An outer frame 1 is fastened to the agricultural tool, said outer frame being placed on a lift vehicle, not shown, which can be raised and lowered by means of hydraulic cylinders, not shown. The spreading boom comprises a suspension device with spring suspension and shock absorbing devices such as a trapezoidal suspension which is fastened to the outer frame 1. The trapezoidal suspension is provided with a trapezoidal yoke 2. Two trapezoidal arms 4 inclining upwards and towards the center are fastened to said trapezoidal yoke 2. The trapezoidal arms 4 are pivotally fastened to the lower yoke 2 and connected to mutually (at 20 and 21) linked arms 6, 7 at the top. Each of the linked arms 6, 7 are turnable about fixed points of rotation 8, 9 on the above outer frame 1, said outer frame being fastened to the vehicle per se by means of the lift vehicle. Furthermore, an elongated angle bar 10 is fastened to the outer frame 1. Sturdy coil springs 12 have been inserted between the angle bar 10 and the linked arms 6, 7. Fittings 13 in the form of tubular means have been arranged on the angle bar 10 and the linked arms 6, 7, respectively, to control and retain the springs 12. The lower portion of the trapezoidal suspension may oscillate and therefore it is necessary to retain the spring 12. The spring 12, however, absorbs some of the oscillation. An oblique shock absorber 15 is furthermore arranged between one of the diagonal trapezoidal arms 4 and the lower yoke 2, thereby attenuating possible oscillations very quickly. A small fitting with a rubber stop 16 is arranged on a separate beam fastened to the outer frame to the right of the left spring 12, said rubber stop preventing the spring from being overloaded and being pressed to the bottom. Further, a vertical shock absorber 17 is provided to the left of the right spring 12. The vertical shock absorber 17 attenuates the oscillations in the vertical direction.

Two vertical U-shaped profiles 18 extend upwardly from the elongated angle bar and have three holes provided in the middle. Said profiles serving as an attachment means to fasten the outer frame 1 to the lift vehicle. Furthermore, some slide blocks are provided, said slide blocks sliding on the vertical profiles 28 in which the lift vehicle is guided.

The trapezoidal suspension according to the invention provides a more symmetrical load on the boom when the tractor/agricultural vehicle encounters a roughness and is subjected to an unsymmetrical influence. A possible load on one side is distributed between the two sides by means of the linked arms in such a manner that the spraying boom remains substantially parallel to the surface of the ground for instance if one of the wheels of the tractor encounters a small elevation. As a result, the bracket arms are prevented from oscillating in relation to the horizontal plane, which so far has been a very great problem, especially in case of very long bracket arms. In order to be able to turn freely about the fixed points of rotation 8, 9, the links 6 and 7 have been interconnected by means of an extra link 26, said link 26 being pivotally connected to one end of the link 7 in the point of rotation 21 and with an upward extending portion of the link 6 in the point of rotation 20.

Figure 3:
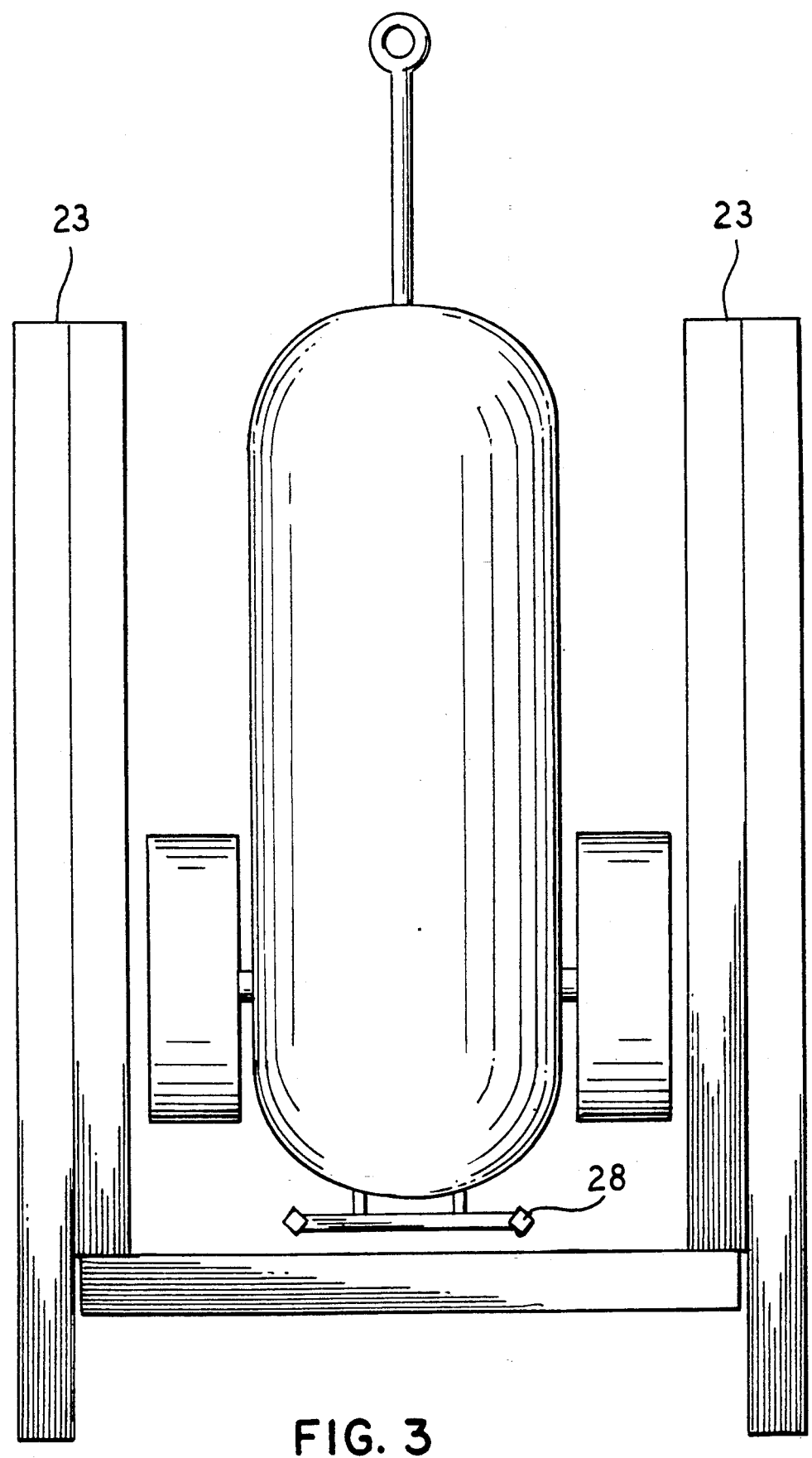
FIG. 3 is a plan view of the spreading boom mounted on an agricultural vehicle with the bracket arms in a folded position.
Figure 4:
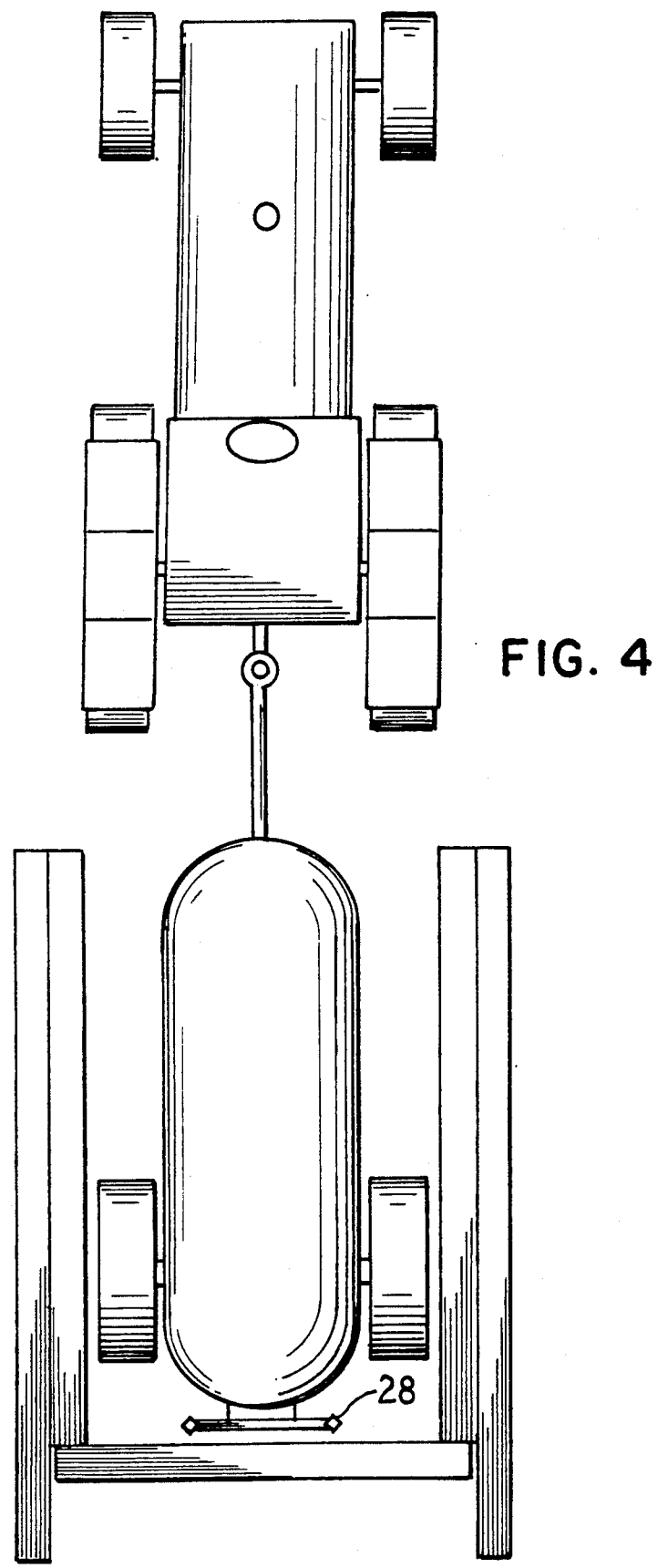
FIG. 4 shows the agricultural vehicle with the spreading boom drawn by a tractor.

When the spreading boom is not in use, the bracket arms may be folded, cf. FIG. 3. The bifurcated bracket arms are hinged in pivot joints 23 and may be turned in a substantially horizontal plane, for instance by means of hydraulic cylinders.

We claim:

1. A boom having a suspension device and an outer frame for use with an agricultural tool, such as an agricultural vehicle, wherein said outer frame is fastened to said agricultural tool and said suspension device comprises a suspension having springs and shock absorbing devices in the form of a trapezoidal suspension with two substantially parallel beams, comprising an upper and lower beam, said upper beam being formed of links, said links being pivotally joined together near a center of said suspension and each link pivotally joined to said outer frame outwardly of said center, with said springs biasing said links at points outwardly of points of said pivotal joining of said links and said outer frame.

2. A boom according to claim 1, further comprising an elongated bar having a means for attaching said elongated bar to said outer frame, wherein said springs are disposed between said links and said elongated bar.

3. A boom according to claim 1, wherein said trapezoidal suspension device includes diagonal bars connecting said parallel beams and a shock absorbing device being mounted between one of said diagonal bars and said lower beam.

* * * * *